United States Patent [19]
Tabaroni et al.

[11] Patent Number: 5,770,003
[45] Date of Patent: Jun. 23, 1998

[54] MOULDING OF CONTAINERS

[75] Inventors: Roberto Tabaroni, Bologna; Andrea Bartoli, Reggio Emilia, both of Italy

[73] Assignee: Unifill S.p.A., Modena, Italy

[21] Appl. No.: 500,614

[22] Filed: Jul. 11, 1995

[30] Foreign Application Priority Data

Jul. 12, 1994 [IT] Italy .................................. MO94A0106

[51] Int. Cl.$^6$ ............................. B65B 47/08; B29C 49/00
[52] U.S. Cl. ........................ 156/382; 156/381; 156/465; 156/500; 425/503; 425/530; 425/538
[58] Field of Search ..................... 156/381, 382, 156/292; 425/503, 515, 530, 523, 535, 526, 538; 264/520, 522, 527; 53/553, 560, 561; 150/214, 461, 465, 500

[56] References Cited

U.S. PATENT DOCUMENTS

| | | |
|---|---|---|
| 2,449,512 | 9/1948 | Scheuer ................................. 425/530 |
| 3,846,531 | 11/1974 | Reilly ..................................... 264/520 |
| 4,047,873 | 9/1977 | Farrell .................................... 425/523 |
| 4,170,622 | 10/1979 | Uhlig ..................................... 264/520 |
| 4,862,676 | 9/1989 | Mancini ................................. 264/522 |
| 4,937,021 | 6/1990 | Danforth et al. ...................... 264/522 |
| 5,223,073 | 6/1993 | Freddi et al. .......................... 264/522 |
| 5,505,612 | 4/1996 | Mero et al. ............................. 425/530 |

FOREIGN PATENT DOCUMENTS

0479152A2  9/1991  European Pat. Off. .
WO94/08852  4/1994  WIPO .

*Primary Examiner*—Richard Crispino
*Attorney, Agent, or Firm*—Reising, Ethington, Learman & McCulloch, PLLC

[57] ABSTRACT

A system for moulding containers in thermoformable and heat-weldable material. The system includes a heating and welding station and a forming and shape-stabilizing station, with at least one welding and forming station in-between, producing progressive forming and shape-stabilizing of the containers.

17 Claims, 5 Drawing Sheets

MOULDING OF CONTAINERS

BACKGROUND OF THE INVENTION

1. Technical Field

This invention relates generally to a method and apparatus for moulding containers, and more particularly, to moulding containers of all capacities with a substantially uniform wall thickness.

2. Background Art

International patent application publication No. WO94/08852 discloses a system for blow-moulding containers from a pair of webs of thermoformable and heat-weldable material including a preheating station for preheating sheets, a heating, forming and welding station for welding the webs and commencing forming of the containers and a final forming and shape-stabilizing station.

Mould halves at the heating, forming and welding station are formed with moulding channels whereby forming fluid introduced between the heated webs forms conduits between the sheets.

EP-B-0479152 discloses a blow-moulding system in which advancement clamps move two mutually facing films along a path on which the following are arranged in sequence: two welding half-moulds, which by mutually welding the two films in preset regions define the outlines of containers which are open toward a longitudinal edge of the films; two half-moulds for heating the welded films and a container-forming station. Air injection nozzles, inserted between two edge flaps at that longitudinal edge of the films, and two forming half-moulds, in which container-forming cavities are provided, operate in the forming station. Divaricators for divaricating the two flaps are provided proximate to the forming station so as to facilitate the insertion of the air injection nozzles.

The containers are filled by injecting a product through an open inlet of each container, the inlets being then closed by heat-welding.

At the forming station, the external surfaces of the air injection nozzles define the internal surfaces of the inlets and these remain open until after the containers have been filled and thus the interiors of the containers remain accessible to any contaminants present.

In the event that the formed containers are transported to other premises for filling, the risk of contamination of their interiors greatly increases.

However, a problem arises in moulding larger capacity containers, namely those having a volume greater than about 400 ml., in that there is a tendency towards excessive thinness of the container walls in those areas of the webs subject to considerable stretching, for example in the area of the base of a container with a wide base and tapered neck. Such prior art could be considerably improved with a view to eliminating its various drawbacks.

DISCLOSURE OF THE INVENTION

A general object of the present invention is to provide a moulding system that makes it possible to obtain, from webs of thermoformable and heat weldable material, containers of considerable capacity, greater even than 400 ml., having a substantially uniform wall thickness.

According to one aspect of the present invention, there is provided a method of moulding a container in thermoformable and heat-weldable material, including a heating and welding phase and a forming and shape-stabilizing phase, characterized in that between those phases there is at least one welding and forming phase.

According to another aspect of the present invention, there is provided an apparatus for moulding a container in thermoformable and heat weldable material, including a heating and welding station and a forming and shape-stabilizing station including moulding means, characterized in that between those stations there is at least one welding and forming station including other moulding means.

Owing to the invention, it is possible to provide a blow-moulding system in which the material from which the container is formed has greater opportunity to flow so as to obtain a substantially uniform wall thickness.

The number of welding and forming phases can be varied depending upon the material being blow-moulded. For polyvinyl chloride (PVC), polyethylene terephthalate (PET) and high density polyethylene (HDPE), for example, only one welding and forming phase can be used. In a preferred embodiment, more suitable for polypropylene (PP), a blow-moulding method for moulding containers from a pair of webs of thermoformable and heat-weldable material includes between the initial phase and the final forming and shape-stabilizing phase the following phases:

a first intermediate phase of heat-welding and forming;

a second intermediate phase of heat-welding and forming; the initial phase and the two intermediate phases being carried out at progressively higher temperatures up to the softening temperature of the material; the deformation of said pair of webs in the initial phase, the intermediate phases and the final phase becoming progressively greater up to the final phase.

This has the advantage of enabling the formation of containers having uniform wall thickness even in cases of considerable deformation of the pair of webs with respect to their planar undeformed condition.

In a particularly advantageous version, the deformation imparted to said webs occurs in a selective manner, such that firstly and mainly middle areas of the containers attain their stabilized shapes and subsequently and mainly end areas of the containers attain their stabilized shapes. This has the further advantage that it is possible to increase significantly the degree of deformation with the same initial thickness of the sheets, or, with the same degree of deformation, to enable significantly thinner webs to be used.

It is to be noted as regards this point that the areas destined to be subjected to less deformation, for example, the sides of the container, during their preliminary deformation serve as reservoirs of soft material which subsequently can flow towards the areas subjected to considerable deformation, for example, peripheral areas of the bases of the containers being formed.

In a particularly advantageous version the final phase is carried out at a lower temperature than are the preceding phases, at a stabilizing temperature to consolidate the shape of the containers being formed, this temperature being inversely proportional to the specific heat, or proportional to the thermal conductivity, of the material: such a temperature being, for example, from about 20° C. (in the case PVC) to 5°–6° C. (in the case of PP).

This enables the formed containers to be extracted at the end of the final phase without local structural collapsing taking place.

In a particularly advantageous version the following temperature levels are envisaged:

the second heat-welding and forming phase is carried out at a temperature close to the softening temperature of the material;

the first heat-welding and forming phase is carried out at a temperature that is lower than the softening temperature of the material by an amount that is advantageously between approximately 10° C. and approximately 15° C.;

the initial phase is carried out at a temperature that is lower than that of the first heat-welding and forming phase by an amount that is advantageously between approximately 10° C. and approximately 15° C.

Thereby, the temperatures in the thickness of the pair of webs constituting the container can be rendered more uniform, with a consequently improved system.

Owing to the thermal inertia of the material, the cooling in the final phase does not cause the material to become so rigid as to make its shaping difficult, but enables the completion of the deformation of the webs and the subsequent stabilization of the deformation obtained.

The phases may be performed at respective stations having mould recesses of progressively increasing depths.

In particular, the depth of the mould recess forming the intermediate transverse zone of the container in the first welding and forming station is approximately 90% of the depth of the mould recess forming that zone in the final station.

It is possible to put transverse grooves in the middle areas of the walls of the mould recesses of the forming and shape-stabilizing station so as to obtain stiffening ribs of the container, without causing dangerous reductions in thickness of the wall of the container.

In a further advantageous version, the mould recesses in the intermediate stations have middle wall areas which are curved in three dimensions and joined with end wall areas which are curved in two dimensions, is i.e. circularly cylindrical.

The curved middle wall areas are preferably convex, that is, curved oppositely to concavities of the formed container and extend from the middle part of the container being formed to one of its ends.

This enables the deformation of the material in the areas subject to greatest deformation to be delayed thereby favouring the retention of the material in these areas.

In a further advantageous version, at least one of the initial, intermediate or final stations have an injector unit for the forming fluid inserted between the two webs of material: said injector unit having a longitudinal bore for the supply of forming fluid communicating with the inlets of the containers being formed by means of a number of transverse bores.

Alternatively, between said longitudinal bore and said inlets there is also a distributor conduit for the forming fluid, to supply all of the containers in a row with said forming fluid.

In a further advantageous version, particularly suited to the formation of elastic closing devices of the containers, so that they may be easily forced open elastically by the insertion of injection tubes for filling, especially for applications in which it is necessary to maintain hygienically controlled conditions when filling the containers, there is at least one spacer positioned between said pair of webs and defining therewith the distributor conduit of the forming fluid: said injector unit and/or said spacer having one internal edge that can be received in the corresponding mould and extending parallel to the direction of advance of the sheets, which is preferably vertical for reasons of overall dimensions.

The internal edge of said injector unit is aligned with the internal edge of said insert: both edges being of substantially the same shape.

To obtain an optimal seal against leakage of the forming fluid from the corresponding mould, that internal edge has a pair of faces converging towards the inside of the corresponding mould so as to form a pair of external flaps of elastic closing devices for the containers.

To prevent damaging sliding of the webs in a direction perpendicular to their advance, that internal edge has a pair of longitudinal ribs that limit the transverse sliding of said pair of sheets.

It is to be noted, furthermore, that the distributor conduit for the forming fluid in the forming and shape-stabilizing station may be an extension of the corresponding distributor conduit in the preceding intermediate station.

Advantageously, downstream of the final station, there is a shearing station to separate the containers from the pair of webs along a perpendicularly transverse plane.

In order to optimize the conditions of injection of the forming fluid, the axes of the containers in the forming stations are perpendicularly transverse, the inlets of said containers pointing towards one of the longitudinal edges of the sheets.

Furthermore, the containers can be aligned in a single row, or in two opposing parallel rows.

BRIEF DESCRIPTION OF THE DRAWINGS

In order that the invention may be clearly understood and readily carried into effect, reference will now be made, by way of example, to the drawings attached in which.

DESCRIPTION OF THE PREFERRED EMBODIMENTS

Figure 2:
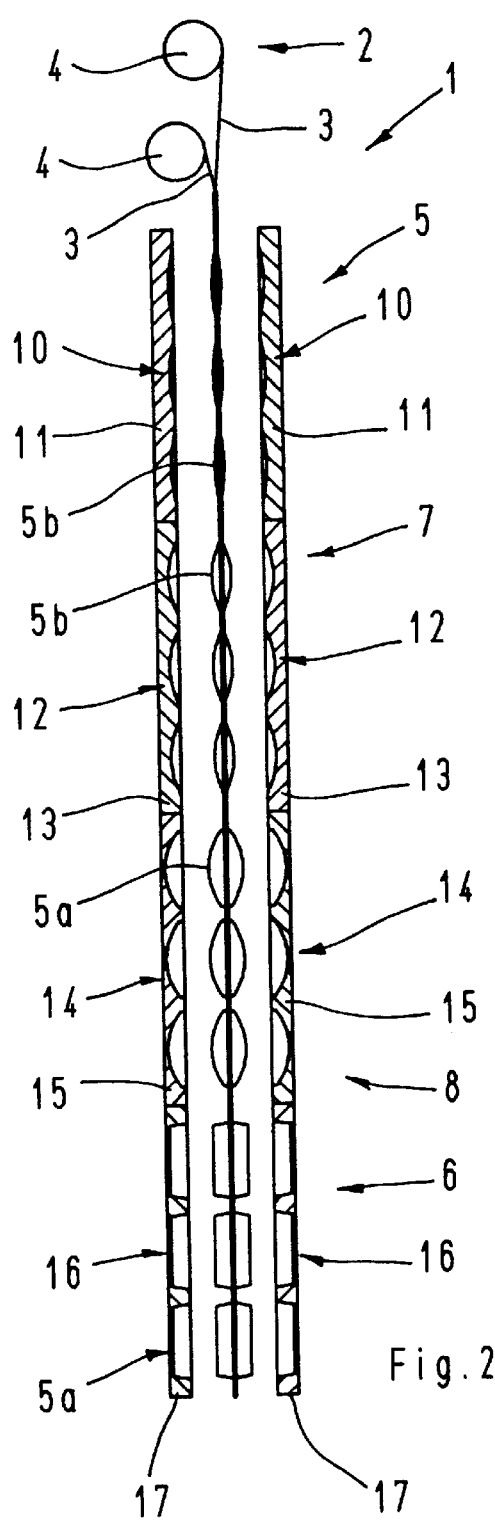
FIG. 2 is a section as in FIG. 1, but with the moulds open.
Figure 1:
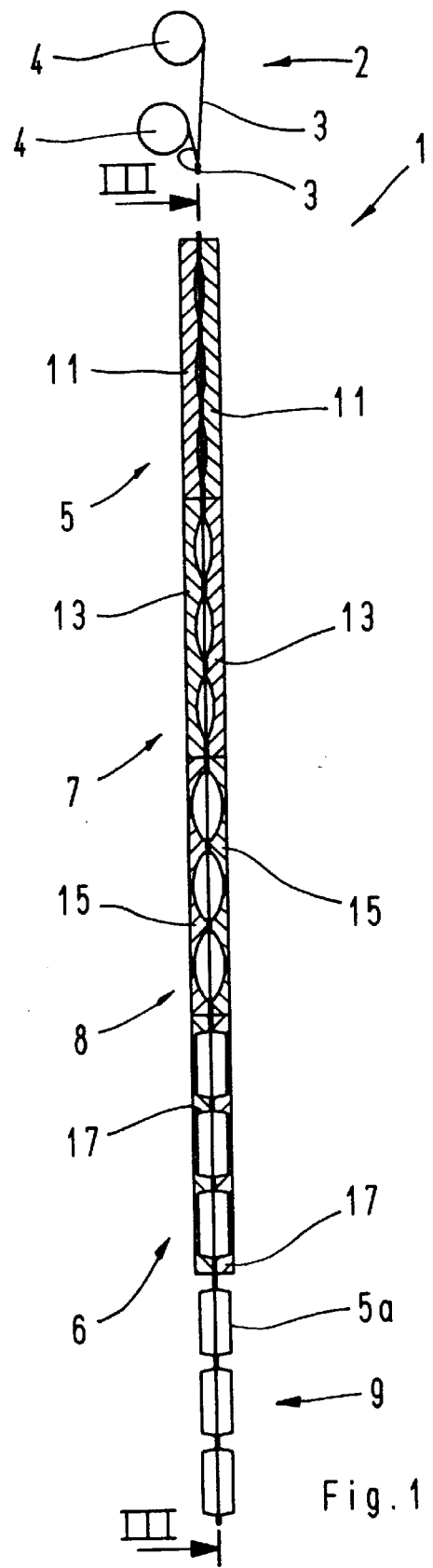
FIG. 1 is a diagrammatic longitudinal section through a blow-moulding apparatus at stations where injection of forming fluid occurs.

Referring initially to FIGS. 1 and 2, the moulding apparatus 1 consists of a feed unit 2 for sheet material comprising a pair of webs 3, advantageously a pair of superimposed sheets, for example, unwound from rolls 4, and of an initial station 5 for heating the webs 3 of material and for welding the outline of the containers 5a, an intermediate station 7 for heat-welding and forming; a successive intermediate station 8 for heat—welding and forming and a forming and shape stabilizing station 6, said stations being aligned in a forming direction F.

The containers 5a are extracted from the forming and shape-stabilizing station 6 joined in groups 9 destined to be separated by shearing the webs 3.

The station 5 has moulding means (herein called "further moulding means") having recess means (herein called "further mould recess means ") in the form of mould recesses 10 of areas corresponding to areas of containers 5a and of a depth that is sufficient to keep the webs 3 separate from each other and pressing against the wall of each recess under the pressure of the forming fluid inserted in the closed condition of the corresponding mould halves 11: the depth being, for example, of the order of a couple of millimeters.

The station 7 has other moulding means having other recess means in the form of mould recesses 12 in mould halves 13 and having a depth profile so as to cause the deformation in webs 3 in the areas destined to be subjected to the least amount of overall deformation.

The station 8 also has other moulding means having other recess means in form of mould recesses 14 in the corresponding mould halves 15 slightly deeper than the recesses 12 to induce further deformation in webs 3 in the areas around the edges of containers 5a.

The forming and shape stabilizing station 6 has recesses 16 in the corresponding mould halves 17 of a shape corresponding to the final shape of containers 5a.

Stations 5, 6, 7 and 8 can have injector units 18 for the forming fluid, for example, heated compressed air, each injector unit 18 being inserted between webs 3, having a closed longitudinal bore 19 feeding the compressed air and communicating through a number of transverse bores 20 with each only partially formed container 5a in a group 9.

Figure 5:
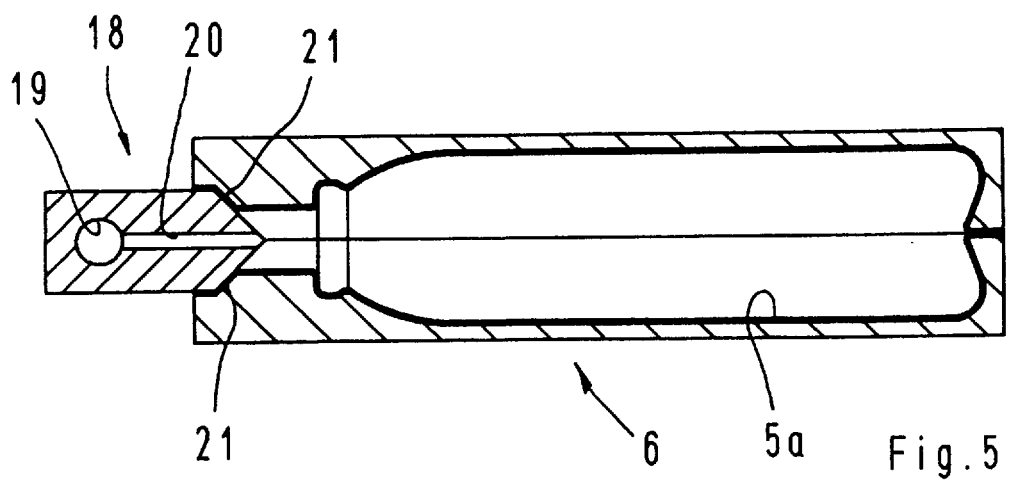
FIG. 5 is a transverse section taken along line V—V of FIG. 3.

The internal edge of injector unit 18 has a pair of faces 21 (FIG. 5) converging towards the inside of the corresponding mould 11, 13, 15, 17 forming a pneumatic seal against webs 3, the faces 21 forming a pair of flaps 21' from the adjacent longitudinal end zones of the webs 3.

Figure 4:
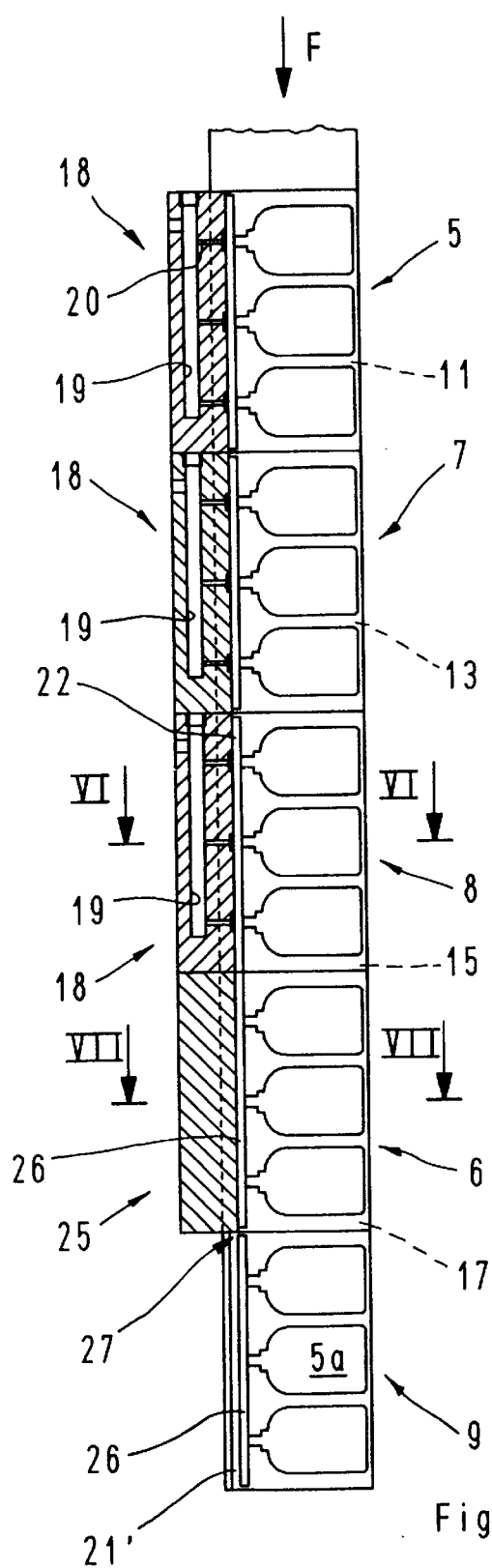
FIG. 4 is a section as in FIG. 3, but in a version for containers to be filled in a sterile environment.
Figure 3:
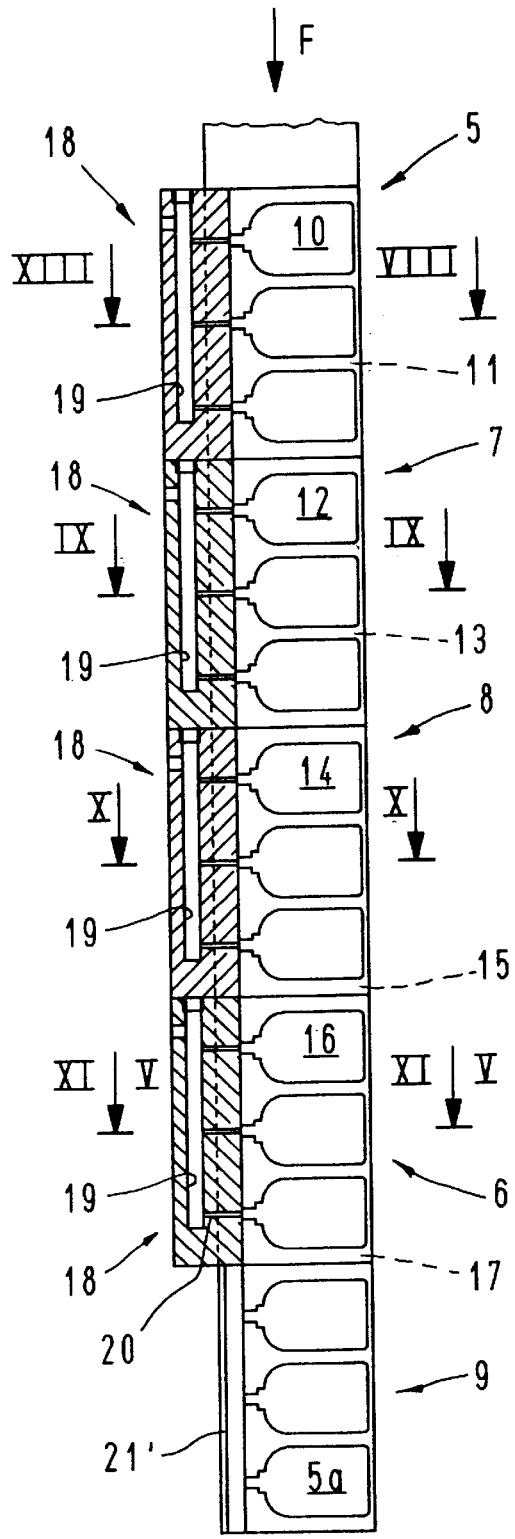
FIG. 3 is a section taken along line III—III of FIG. 1, in a version where the containers are to be filled in conditions that are not hygienically controlled.
Figure 6:
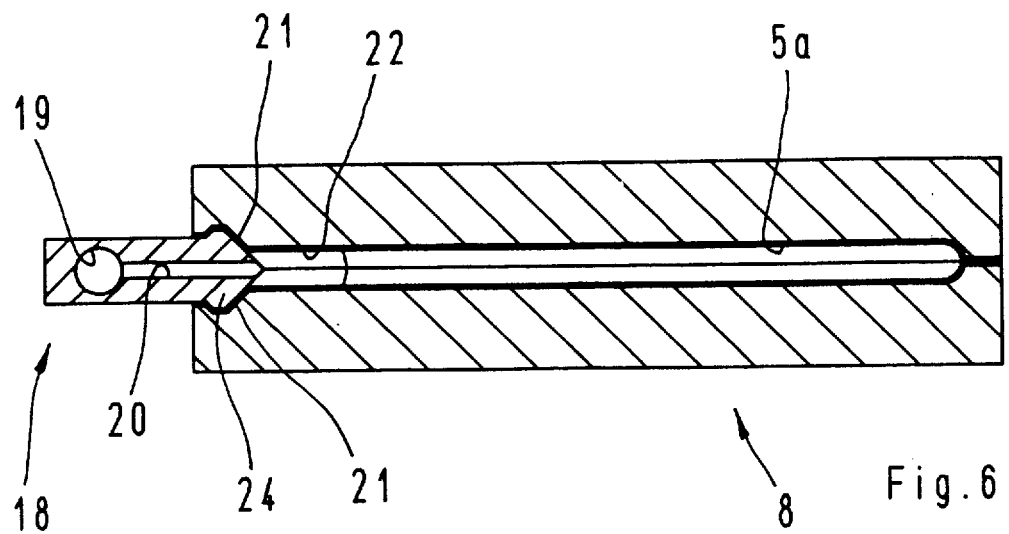
FIG. 6 is a transverse section taken along VI—VI of FIG. 4.
Figure 7:
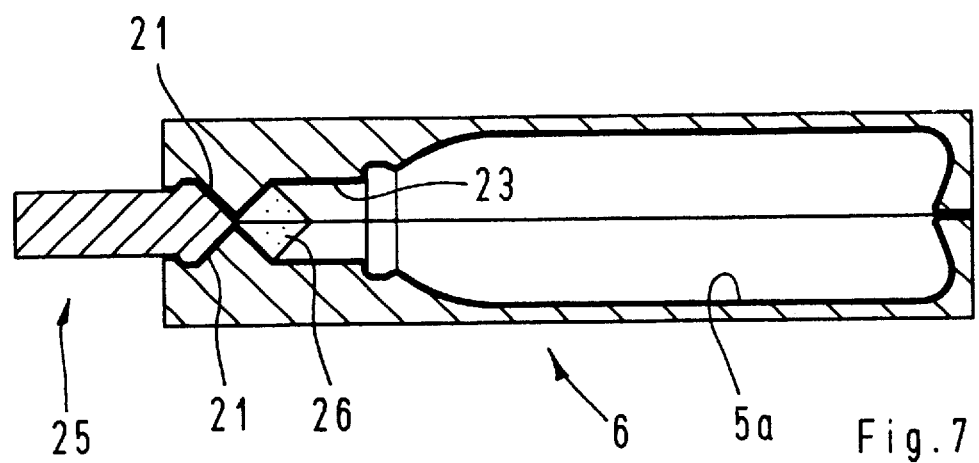
FIG. 7 is a transverse section taken along VII—VII of FIG. 4.

In the version of FIGS. 4, 6 and 7, between the transverse bores 20 of injector unit 18 and the mouths (in this case spouts) 23 of containers 5a being formed, there is a distributor conduit 22 connecting the mouths of the containers 5a.

The internal edge of injector unit 18 has a pair of longitudinal ribs 24 co-operating with corresponding grooves in the mould halves, to ensure sealing and to prevent transverse sliding of webs 3 during forming.

It is to be noted that station 6 for stabilizing the shape of containers 5a include a spacer 25, of an external shape corresponding to that of the injector unit 18, but without the internal bores: this spacer has the function of preventing air from escaping from inside the containers 5a through the non-welded portion of conduit 26 defined by elastic closing devices of containers 5a, the conduit 26 advantageously constituting an extension of the conduit 22 and communicating with it during the injection of the forming fluid.

It is to be noted that the conduit 26 can also be obtained, albeit less advantageously as regards stretching of the material, in the station 8 substituting the distributor conduit 22, taking on, in this case, the function of distributing the forming fluid to the containers being formed also in the station 8.

Owing to the pressing action exerted on it by mould 17 in the area 27 of pressing elements at the lower extremity of the mould 17, conduit 26 is finally sealed at both its longitudinal extremities thereby enabling the inside of each container 2 to be isolated from the outside environment.

Figure 8:
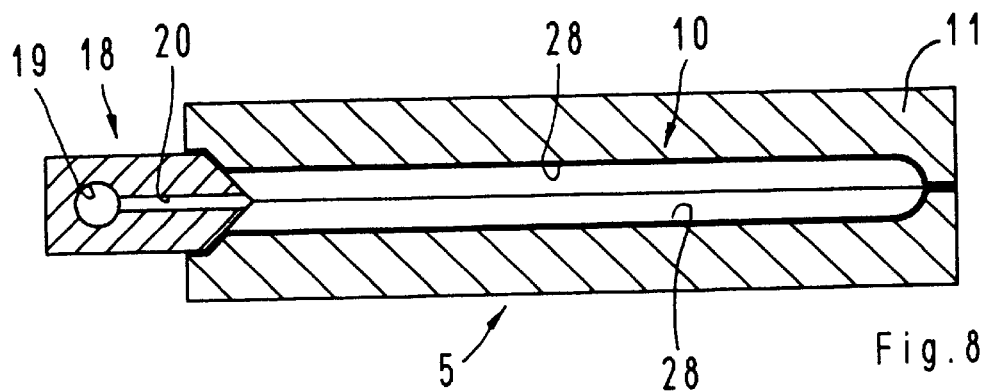
FIG. 8 is a transverse section taken along VIII—VIII of FIG. 3.
Figure 9:
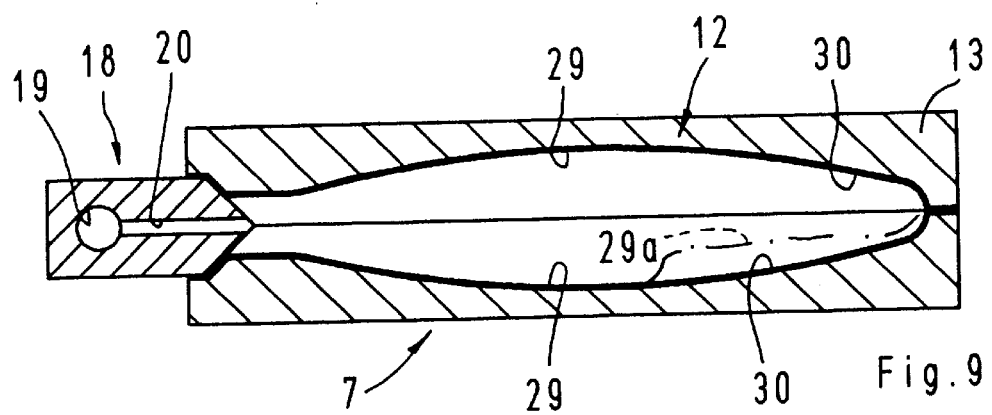
FIG. 9 is a section taken along IX—IX of FIG. 3.
Figure 10:
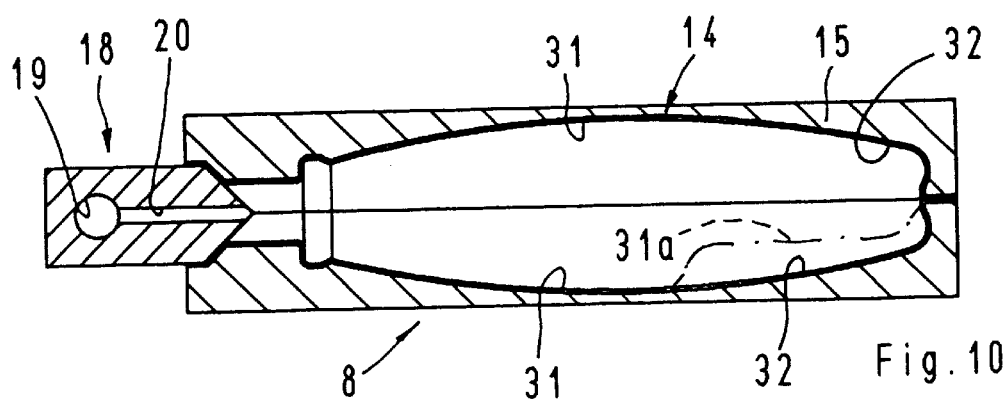
FIG. 10 is a section taken along X—X of FIG. 3.

Mould recesses 10 of station 5 are defined mainly by planar surfaces 28 (FIG. 8) parallel to each other and joined to the edges of the recesses 10 along the outline of the container 5a being formed.

Recesses 12 of welding and second preforming station 7 can have concave portions 29 joined to substantially planar portions 30: or alternatively to convex portions (of which one is shown in broken line and referenced 29a) having the function of inducing a more pronounced deformation of the material in those areas that are subjected to least deformation, so as to keep the material that is subjected to the greatest deformation substantially undeformed until its introduction into the station 6.

Correspondingly, the recesses 14 of the station 8 can have concave wall portions 31 joined to substantially planar wall portions 32; or to convex wall portions 31a.

Figure 11:
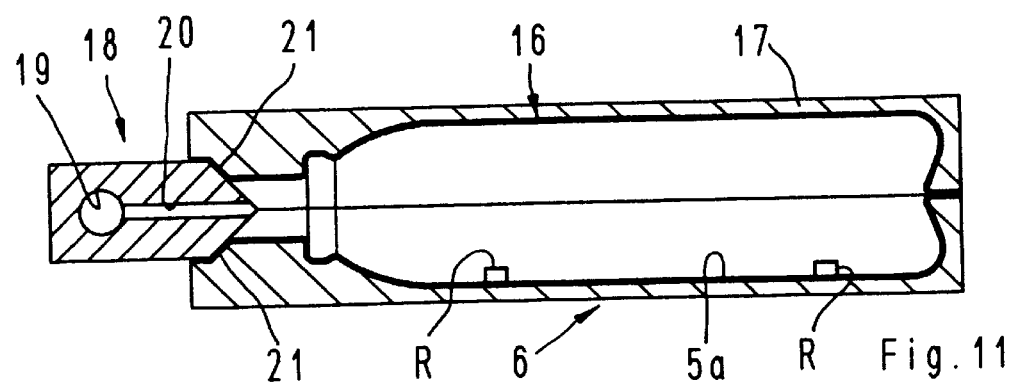
FIG. 11 is a section taken along XI—XI of FIG. 3, but showing a modification.

FIG. 11 shows protrusions R projecting from the middle of the wall of one mould recess 16 of the station 6 and extending transversely of the container 5a to create, between the protrusions R, stiffening ribs for the formed container 5a.

Figures 12, 13:
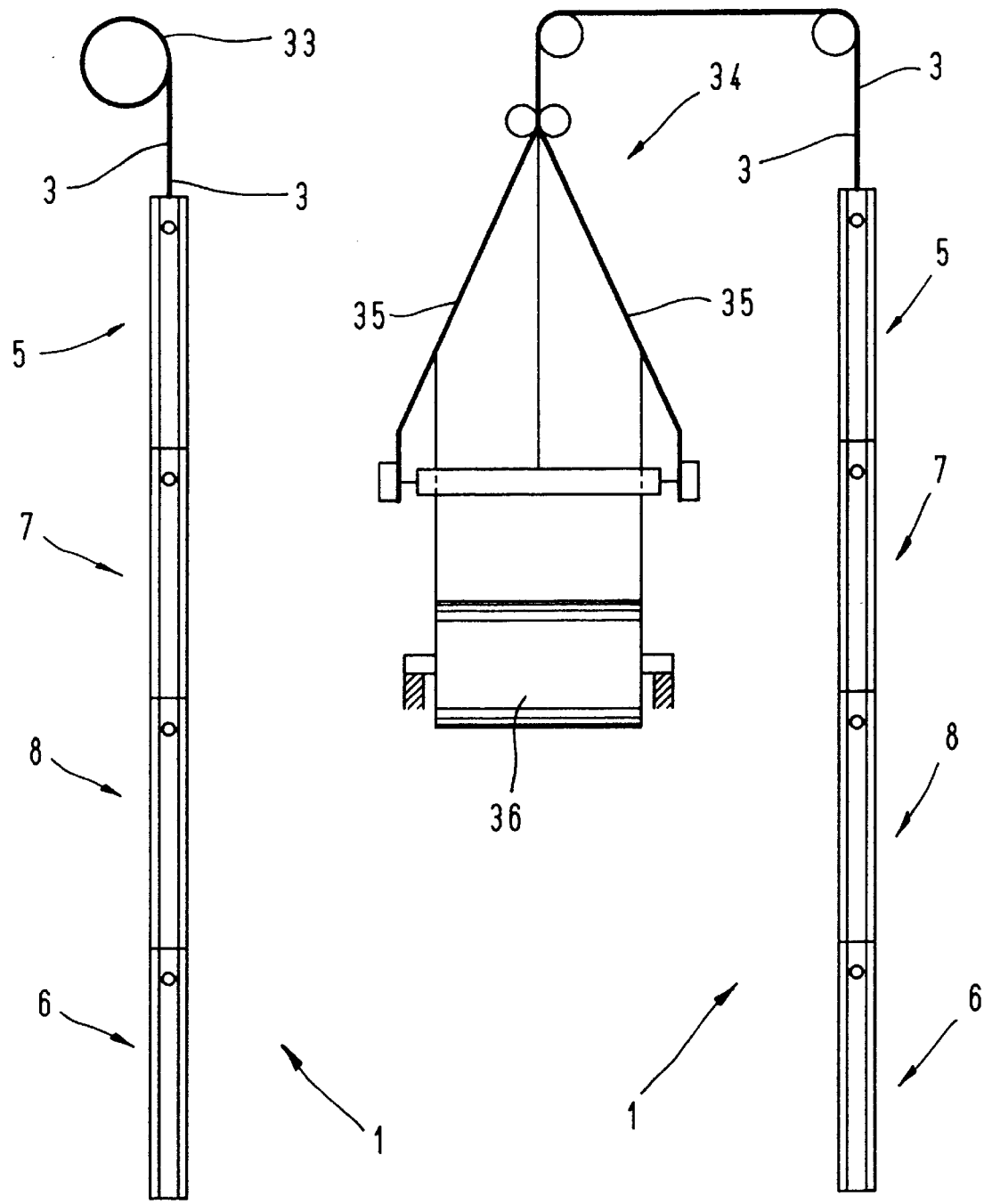
FIG. 12 is a schematic side view of a modified version in which the apparatus is fed with a pair of webs of material joined along a longitudinal edge.
FIG. 13 is a view as in FIG. 12, but of a version fed with a single web folded along a median longitudinal line.

FIG. 12 shows how the roll 33 for the supply of material can consist of two superimposed webs 3, possibly obtained from a single folded strip or a folded sheet having first and second parts forming the two superimposed webs; alternatively, as shown in FIG. 13, the webs 3 can be obtained, using deflector element 34 having converging sides 35, that folds a single strip unwound from roll 36.

The system also includes a filling station for the formed containers, possibly a conveyor to transfer the containers to the filling station, a punching station to trim the outer edges of the filled containers and a permanent welding station for the spouts of the containers once they have been filled.

What is claimed is:

1. Apparatus for moulding containers in thermoformable and heat-weldable sheet material, comprising a heating and welding station, at which first and second parts of said material are heated and welded together, a container-forming and container-shape-stabilizing station, at which said first and second parts are finally shape-stabilized, moulding means of the forming and shape-stabilizing station, mould recess means of said moulding means, at least one welding and forming station which is between said heating and welding station and said forming and shape-stabilizing station and at which said first and second parts are further welded together and a hollow interior is formed between said first and second parts by deformation of said first and second parts, other moulding means of said at least one welding and forming station, other mould recess means of said other moulding means and into which said first and second parts are deformed, and middles of said mould recess means of said moulding means of said forming and shape-stabilizing station and of said other mould recess means.

2. Apparatus according to claim 1, wherein between said heating and welding station and said container-forming and container-shape-stabilizing station there are at least two welding and forming stations including such other moulding means.

3. Apparatus according to claim 1, and further comprising further moulding means of said heating and welding station, and further mould recess means of said further moulding means, said further mould recess means, said mould recess means of said moulding means of said forming and shape stabilizing station and the said other mould recess means being of progressively increasing depth from said further mould recess means to said mould recess means.

4. Apparatus according to claim 3, wherein there is only one welding and forming station and the depth of the middle of said other mould recess means of the welding and forming station is approximately 90% of the depth of the middle of said mould recess means of said moulding means of said forming and shape-stabilizing station.

5. Apparatus according to claim 3, wherein the mould recess means of said moulding means of said forming and shape-stabilizing station have grooves to form stiffening ribs on the containers.

6. Apparatus according to claim 3, wherein said other mould recess means further comprises middle wall parts which are curved and end wall parts which are rectilinear.

7. Apparatus according to claim 3, wherein said other mould recess means further comprises middle wall parts which are curved oppositely to adjacent wall parts.

8. Apparatus according to claim 3, wherein there is a plurality of welding and forming stations and the depth of the middle of said other mould recess means of a first station of said welding and forming stations is approximately 90% of the depth of the middle of the mould recess means of said moulding means of said forming and shaped-stabilizing station.

9. Apparatus according to claim 1, wherein at least one of said heating and welding station, said forming and shape stabilizing station and said at least one welding and forming station further comprises forming means arranged to extend along respective adjacent edges of a pair of webs which constitute said sheet material and from which said containers are to be made, said forming means including an internal edge serving to co-operate with longitudinal edge zones of said webs to define a conduit interconnecting mouths of said containers.

10. Apparatus according to claim 9, and further comprising advancing means for advancing said sheet material along a path, the internal edge of said forming means extending parallel to said path and being receivable in at least one of the moulding means.

11. Apparatus according to claim 9, and further comprising advancing means for advancing said sheet material along a path, the internal edge of said forming means extending parallel to said path, and a pair of ribs parallel to said path and provided on said forming means at the internal edge of said forming means to limit sliding of said sheet material in a direction transverse to said path.

12. Apparatus according to claim 1, wherein said forming and shape-stabilizing station includes spacing means including an internal edge serving to space apart respective adjacent longitudinal edge zones of a pair of webs from which said containers are made and to bound a conduit for forming fluid between said spacing means and said longitudinal edge zones.

13. Apparatus according to claim 12, wherein at least one of said heating and welding station, said forming and shape-stabilizing station and said at least one welding and forming station further comprises forming means arranged to extend along respective adjacent edges of a pair of webs which constitute said sheet material and from which said containers are to be made, said forming means including an internal edge serving to co-operate with longitudinal edge zones of said webs to define a conduit interconnecting mouths of said containers, and wherein the internal edges of said forming means and said spacing means are aligned with one another and of a substantially the same cross-sectional outline.

14. Apparatus according to claim 12, wherein there is only one welding and forming station, wherein at least one of said heating and welding station, said forming and shape-stabilizing, and said welding and forming station further comprises forming means arranged to extend along respective adjacent edges of a pair of webs which constitute said sheet material and from which said containers are to be made, said forming means including internal edges at said welding and forming station and at said forming and shape-stabilizing station serving to co-operate with longitudinal edge zones of said webs to define respective conduits communicating with each other and interconnecting mouths of said container.

15. Apparatus according to claim 12, and further comprising advancing means for advancing said sheet material along a path, the internal edge of said spacing means extending parallel to said path and being receivable in at least one of the moulding means.

16. Apparatus according to claim 12, and further comprising advancing means for advancing said sheet material along a path, the internal edge of said spacing means extending parallel to said path, and a pair of ribs parallel to said path and provided on said spacing means at the internal edge of said spacing means to limit sliding of said sheet material in a direction transverse to said path.

17. Apparatus according to claim 12, wherein there is a plurality of welding and forming stations, wherein at least one of said heating and welding stations, said forming and shape-stabilizing stations, and said welding and forming stations further comprises forming means arranged to extend along respective adjacent edges of a pair of webs which constitute said sheet material and from which said containers are to be made, said forming means including internal edges at said forming and shaped-stabilizing station and at the forming and welding station immediately preceding said forming and shaped-stabilizing station serving to co-operate with longitudinal edge zones of said webs to define conduits communicating with each other and interconnecting mouths of said containers.

\* \* \* \* \*

UNITED STATES PATENT AND TRADEMARK OFFICE
CERTIFICATE OF CORRECTION

PATENT NO. : 5,770,003
DATED : June 23, 1998
INVENTOR(S) : Roberto Tabaroni, Andrea Bartoli It is certified that error appears in the above-identified patent and that said Letters Patent is hereby corrected as shown below:

Column 8, line 41, change "stations" to

--station--.

Column 8, line 42, change "stations" to

--station--.

Signed and Sealed this

Fifteenth Day of September, 1998

*Attest:*

BRUCE LEHMAN

*Attesting Officer*  *Commissioner of Patents and Trademarks*